US012751355B2

(12) United States Patent
Kazi et al.

(10) Patent No.: US 12,751,355 B2
(45) Date of Patent: Oct. 6, 2026

(54) MOWER DECK DRAG LINK

(71) Applicant: DEERE & COMPANY, Moline, IL (US)

(72) Inventors: Mohseen V. Kazi, Pune (IN); Curtis D. Ayers, Willow Spring, NC (US); Umakanta Padhan, Pune (IN); Ashley T. Moorehead, Holly Springs, NC (US); William W. Wheeler, Willow Springs, NC (US)

(73) Assignee: Deere & Company, Moline, IL (US)

( * ) Notice: Subject to any disclaimer, the term of this patent is extended or adjusted under 35 U.S.C. 154(b) by 365 days.

(21) Appl. No.: 18/489,119

(22) Filed: Oct. 18, 2023

(65) Prior Publication Data

US 2025/0127083 A1 Apr. 24, 2025

(51) Int. Cl.
*A01D 34/81* (2006.01)
*A01D 34/66* (2006.01)
*A01D 101/00* (2006.01)

(52) U.S. Cl.
CPC ........... *A01D 34/661* (2013.01); *A01D 34/81* (2013.01); *A01D 2101/00* (2013.01)

(58) Field of Classification Search
CPC .............................. A01D 34/81; A01D 34/828
See application file for complete search history.

(56) References Cited

U.S. PATENT DOCUMENTS 2,152,252 A * 3/1939 Godwin ................. A01D 34/62 56/249.5
2,168,706 A * 8/1939 George ................ A01D 75/306 180/6.62
2,335,054 A * 11/1943 Godwin ................. A01D 34/42 56/15.8
3,706,186 A 12/1972 Hurlburt et al.
3,948,025 A 4/1976 Erdman
4,882,898 A 11/1989 Samejima et al.
5,025,617 A 6/1991 Kuhn et al.
5,065,568 A * 11/1991 Braun .................... A01D 34/64 56/DIG. 14
5,956,932 A 9/1999 Schmidt
6,293,077 B1 9/2001 Plas et al.
6,454,018 B2 * 9/2002 Tozer .................... E01C 23/082 172/29
6,584,756 B2 7/2003 Buss
6,679,037 B1 1/2004 Hitt et al.
7,325,388 B2 * 2/2008 Wright ................... A01D 69/03 56/17.1
7,600,363 B2 10/2009 Porter et al.
7,669,394 B2 3/2010 Finkner et al.

(Continued)

OTHER PUBLICATIONS

Toro GrandStand Mower (Year: 2021).*

(Continued)

*Primary Examiner* — Cathleen R Hutchins

(57) ABSTRACT

A mower deck drag link having a generally rectangular structure pivotably mounted between a rotary mower deck and a mowing vehicle frame. The structure has an outer rim or perimeter member and a plurality of intersecting diagonal members providing an X-shaped pattern across the perimeter member. A forward bearing housing and a rear bearing housing is on each of a left side and a right side of the perimeter member.

10 Claims, 3 Drawing Sheets

(56) References Cited

U.S. PATENT DOCUMENTS

| | | | | |
|---|---|---|---|---|
| 10,144,456 | B1 * | 12/2018 | Ciccone | B62D 25/082 |
| 11,071,248 | B1 | 7/2021 | Funk et al. | |

OTHER PUBLICATIONS

Google search results: Toro lawnmower drag links (Year: 2026).*
Google search results: John Deere deck strut mower (Year: 2026).*
Google search results: John Deere drag link mower (Year: 2026).*
Google search results: John Deere puller strut mower (Year: 2026).*
Hustler 121446—Puller W/A Flip-Up, pp. 1-4, [online], [retrieved on Sep. 21, 2023]. Retrieved from the Internet <URL: https://www.hustlerlawnmowerparts.com/hustler-part121446/?srsltid=AfmBOop3rEntlcRfOddvYUBru6yJyPj_HwTOkvE1fyB1YkqaKt0LWslDgpc>.
Image of Toro Mower Deck Strut Assembly, pp. 1-4, [online], [retrieved on Sep. 21, 2023]. Retrieved from the Internet <URL: https://www.google.com/search?q=toro+mower+deck+strut+assembly&rlz=1C1GCEB_enUS891US891&oq=toro+mower+deck+strut+assembly&aqs=%E2%80%A6>.

* cited by examiner

MOWER DECK DRAG LINK

FIELD OF THE INVENTION

This invention relates generally to rotary mower decks on zero turning radius or stand on mowers, and specifically to a mower deck drag link connecting a floating mower deck to the vehicle frame.

BACKGROUND OF THE INVENTION

Grass mowing machines used by professional landscapers and for commercial mowing applications include stand on mowers and zero turning radius (ZTR) mowers. Stand on and ZTR mowers have at least one independently powered drive wheel on each side of a vehicle frame. The independent drive wheels allow the mower to turn on a vertical turning axis centrally located between the drive wheels. An operator may use left and right control levers, joysticks or other similar steering controls to control the drive wheels and mow at ground speeds as fast as 7 mph-8 mph or more.

These mowers typically have floating mower decks with a plurality of rotary mower blades attached to spindles. A lift linkage may be attached to each side of the floating mower deck with chain links or other connectors. A lever or other control may pivot the mower deck lift linkage to raise or lower the mower deck to change the height of cut or move the mower deck to a transport position. Caster wheels mounted to the front end of the vehicle frame may support the floating mower deck over the ground surface.

Floating mower decks may include a drag link (also sometimes referred to as a puller or deck strut). The drag link may be pivotably mounted between the vehicle frame and the front of the mower deck. The drag link is used to help pull the mower deck forward, keeping the mower deck in alignment with the vehicle and parallel to the ground surface.

In the past, drag links were sheet metal structures with pivoting connections to the vehicle frame and floating mower deck. However, these drag links could twist if the mower deck jerks or hits an obstacle, resulting in damage to the drag link and misalignment between the vehicle and mower deck. These drag links also blocked the operator sight line to the mower deck.

A mower deck drag link is needed resists twisting, is low cost and light weight, and improves visibility of the mower deck.

SUMMARY OF THE INVENTION

A mower deck drag link is a generally rectangular structure pivotably mounted between a mowing vehicle frame and a mower deck, and having a perimeter member with a front, a left side, a right side, and a rear portion. A plurality of diagonal members intersect each other and extend across the perimeter member in an X-shaped bracing pattern. A forward pivot axis and a rear pivot axis are located on each of the left side and the right side of the perimeter member.

DESCRIPTION OF THE PREFERRED EMBODIMENT

Figure 1:
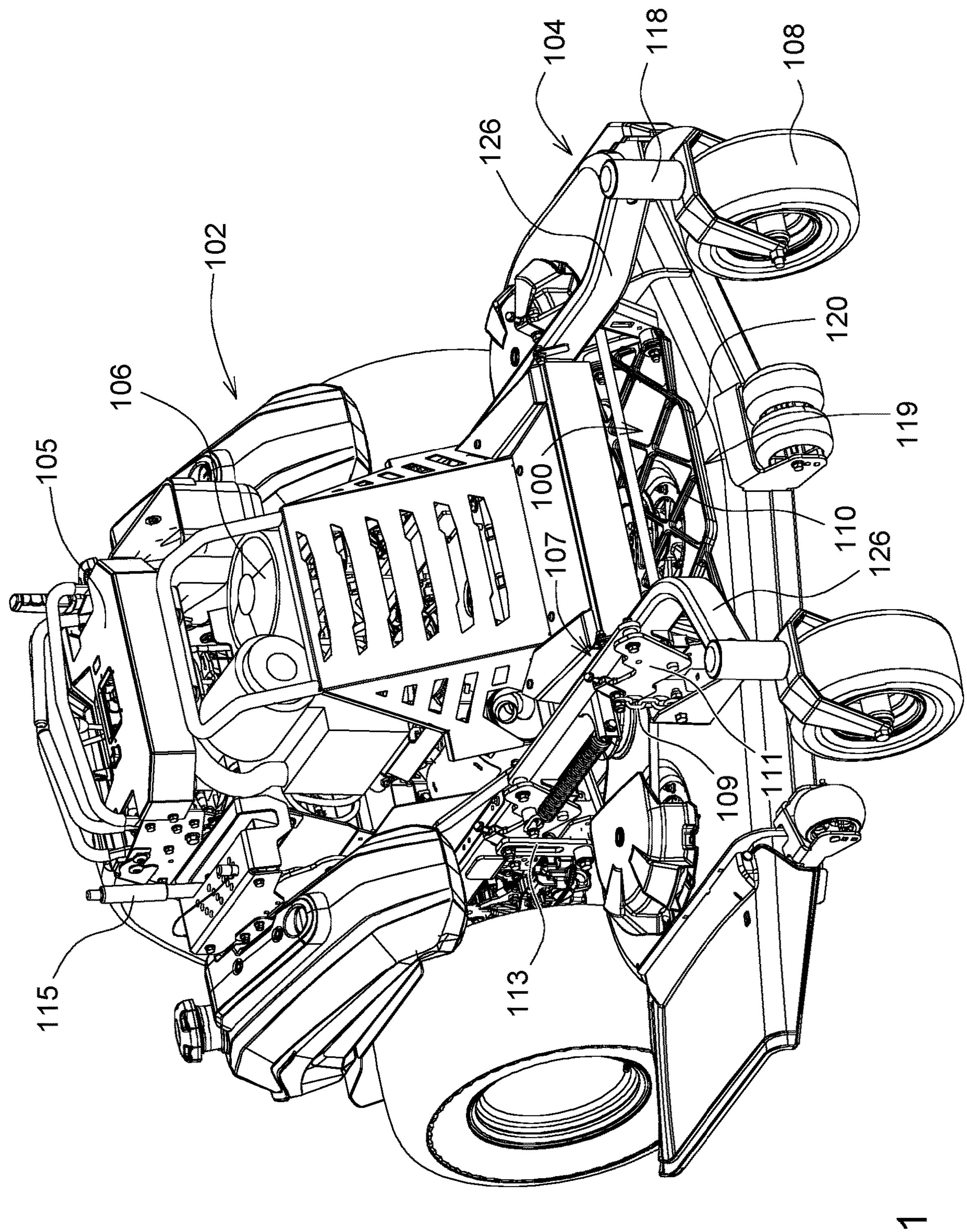
FIG. 1 is a front perspective view of a stand on mower with a mower deck drag link according to a first embodiment of the invention.
Figure 2:
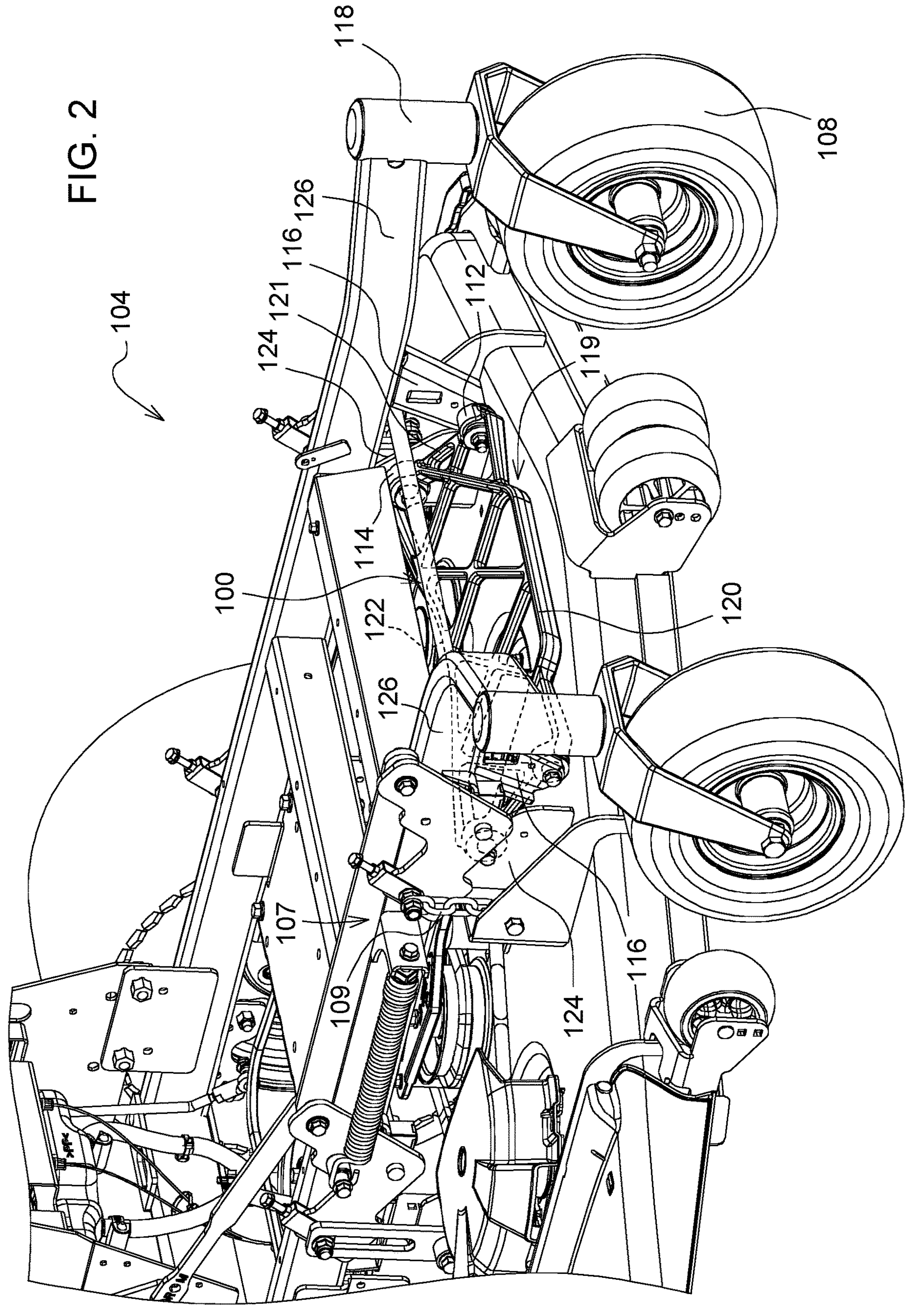
FIG. 2 is a front perspective view of a mower deck drag link connected between a floating mower deck and vehicle frame according to a first embodiment of the invention.
Figure 3:
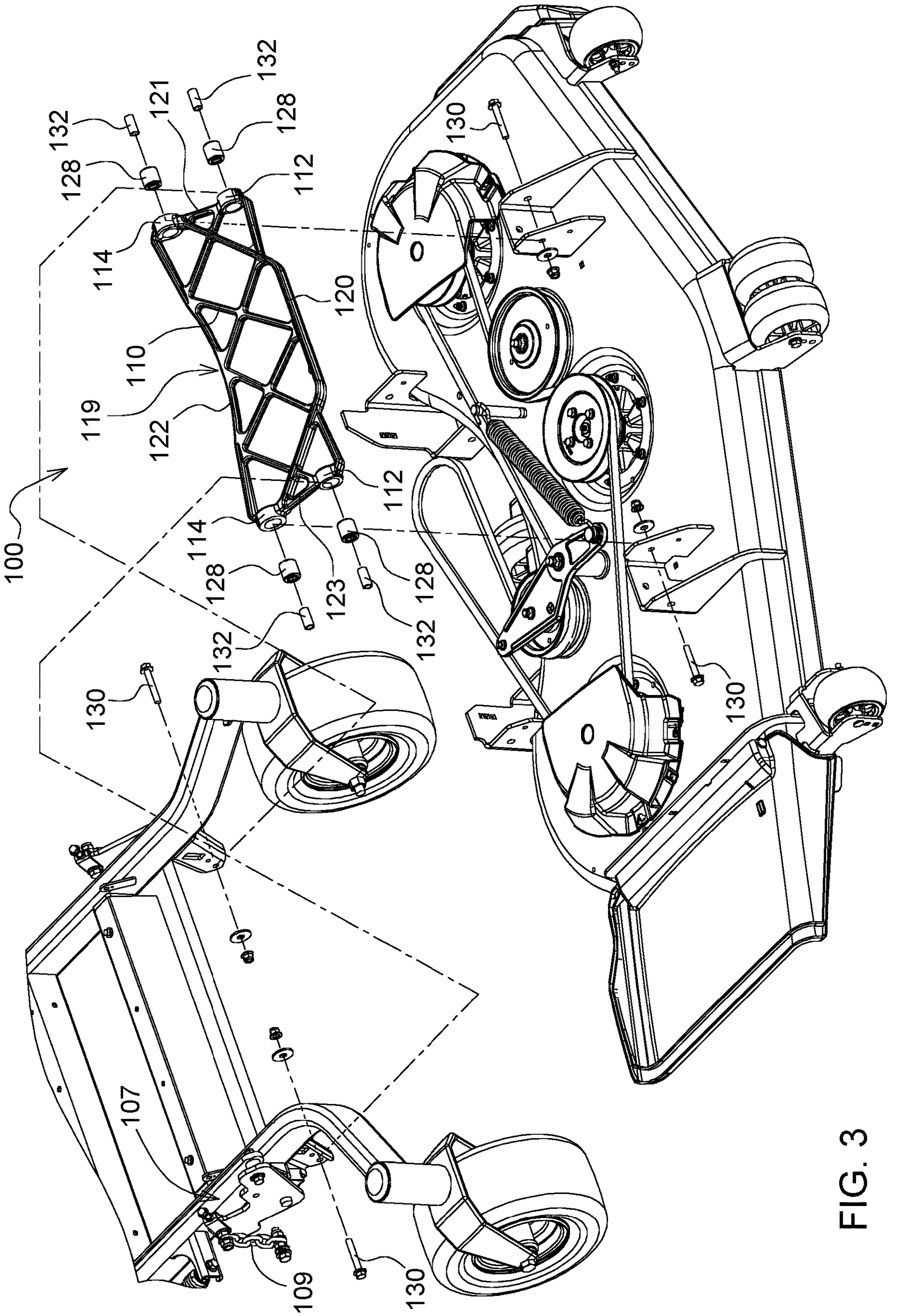
FIG. 3 is an exploded perspective view of a mower deck drag link, floating mower deck, and vehicle frame according to a first embodiment of the invention.

In one embodiment shown in FIGS. 1-3, mower deck drag link 100 may be used on stand on mower 102 or zero turning radius (ZTR) mower with floating mower deck 104. The floating mower deck may be positioned under left and right vehicle frame members 126. The forward end of each vehicle frame member 126 may be supported by front caster wheel 108 mounted to caster wheel yoke 118. Internal combustion engine 106 or an alternative power source may be supported by the vehicle frame rearwadly of the floating mower deck. Operator station 105 may be rearwardly of the mower deck and engine of a stand on mower.

In one embodiment shown in FIGS. 1-3, mower deck drag link 100 is shown on stand on mower 102 having deck lift linkage 107 with lift arms 111 connected by chain links 109 or similar connectors 113 attached to the mower deck 104. Lever or handle 115 may be connected to the lift linkage and may be used to pivot the lift arms to raise the mower deck to a height of cut set with a pin inserted into a hole in height of cut plate, or similar height of cut mechanisms.

In one embodiment shown in FIGS. 1-3, mower deck drag link 100 may have a generally rectangular shape including outer rim or perimeter member 119 having front portion 120, left and right sides 121, 123 and rear portion 122. The mower deck drag link may be installed on the stand on or ZTR mower where it may pivot on a first or forward pivot axis located at the vehicle frame, and a second or rear pivot axis located at the mower deck. The first or forward pivot axis at the vehicle frame may be located lower than each second or rear pivot axis at the mower deck. The first or forward pivot axis at the vehicle frame may include threaded connector 130 inserted through a hole in bracket 116 extending below vehicle frame member 126, through sleeve 132 and bearing 128 held in housing or bore 112 near the front of the side portion of the rim or perimeter member, and secured with a nut. The second or rear pivot axis at the mower deck may include threaded connector 130 inserted through a hole in bracket 124 extending above mower deck 104, through sleeve 132 and bearing 128 held in housing or bore 114 near the rear of the side portion of the rim or perimeter member, and secured with a nut.

In one embodiment shown in FIGS. 1-3, mower deck drag link 100 may have a plurality of diagonal members 110 that intersect each other. Each of the diagonal members may extend across perimeter member 119, such as between front 120 and rear 122, or between the front or rear of the perimeter member and either side 121, 123 of the perimeter member. The diagonal supports provide an X-shaped bracing pattern that provides stiffness, increases torsional rigidity, and increases the ability of the drag link to withstand lateral loads.

In one embodiment shown in FIGS. 1-3, mower deck drag link 100 may be a steel or alloy casting. This drag link structure has less cost and weight than existing sheet metal drag links. The drag link provides visibility through the X-shaped bracing pattern to view the mower deck.

Having described the preferred embodiments, it will become apparent that various modifications can be made without departing from the scope of the invention as defined in the accompanying claims.

The invention claimed is:

1. A mower deck drag link, comprising:

a generally rectangular structure pivotably mounted between a mowing vehicle frame and a mower deck, and having a perimeter member with a front, a left side, a right side, and a rear portion;

a plurality of diagonal members that intersect each other and extend between the perimeter member in an X-shaped bracing pattern having a plurality of X-shapes; and a forward pivot axis and a rear pivot axis located on each of the left side perimeter and the right side of the perimeter member.

2. The mower deck drag link of claim 1 wherein each of the forward pivot axis and the rear pivot axis include a bore with a bearing inserted therein.

3. The mower deck drag link of claim 1 wherein each forward pivot axis is lower than each rear pivot axis.

4. The mower deck drag link of claim 1 wherein the rectangular structure is a metal casting.

5. A mower deck drag link, comprising:

a metal casting having an outer rim and an X-shaped bracing pattern having a plurality of X-shapes pivotably mounted on a forward pivot axis located on a mowing vehicle frame and pivotably mounted on a rear pivot axis located on a mower deck.

6. The mower deck drag link of claim 5 wherein the forward pivot axis is lower than the rear pivot axis.

7. The mower deck drag link of claim 5 wherein the outer rim includes a front, a left side, a right side, and rear portion.

8. A mower deck drag link, comprising:

a generally rectangular structure pivotably mounted between a rotary mower deck and a mowing vehicle frame;

the structure having a perimeter member and a plurality of intersecting diagonal members providing an X-shaped pattern having a plurality of X-shapes across the perimeter member; and a forward bearing housing and a rear bearing housing on each of a left side and a right side of the perimeter member.

9. The mower deck drag link of claim 8 wherein a front of the generally rectangular structure is pivotably mounted to the mowing vehicle frame below a rear of the structure that is pivotably mounted to the rotary mower deck.

10. The mower deck drag link of claim 8 wherein the structure is pivotably mounted to the rotary deck with a pair of brackets extending above the rotary mower deck, and is pivotably mounted to the mowing vehicle frame with a pair of brackets extending below the mowing vehicle frame.

* * * * *